O. PAPPANO.
MEASURING INSTRUMENT.
APPLICATION FILED JAN. 12, 1909.
929,477.
Patented July 27, 1909.
3 SHEETS—SHEET 1.
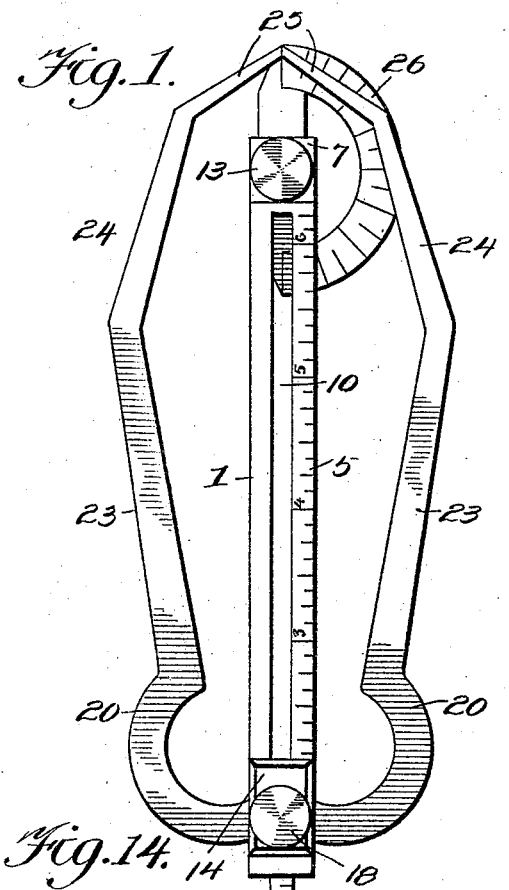
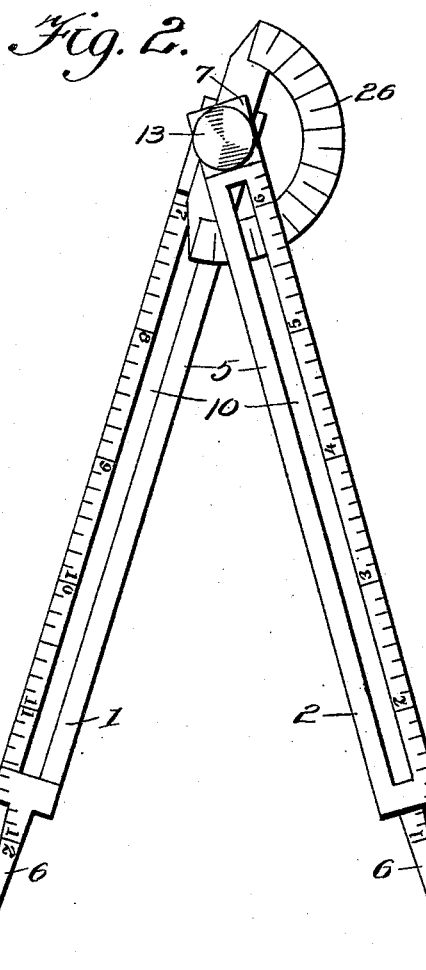
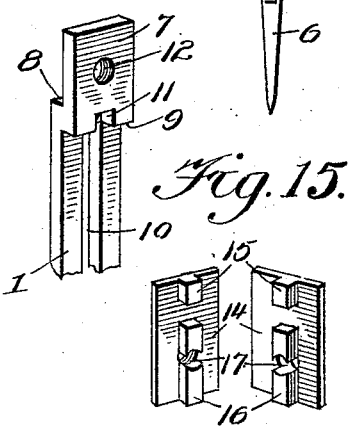
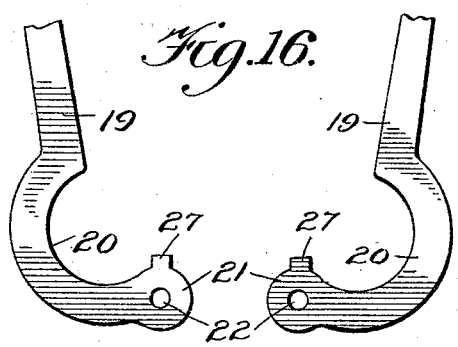
Witnesses
H. Ackman Jr.
D. W. Gould.
Inventor
Oreste Pappano,
By Victor J. Evans
Attorney O. PAPPANO.
MEASURING INSTRUMENT.
APPLICATION FILED JAN. 12, 1909.
929,477.
Patented July 27, 1909.
3 SHEETS—SHEET 2.
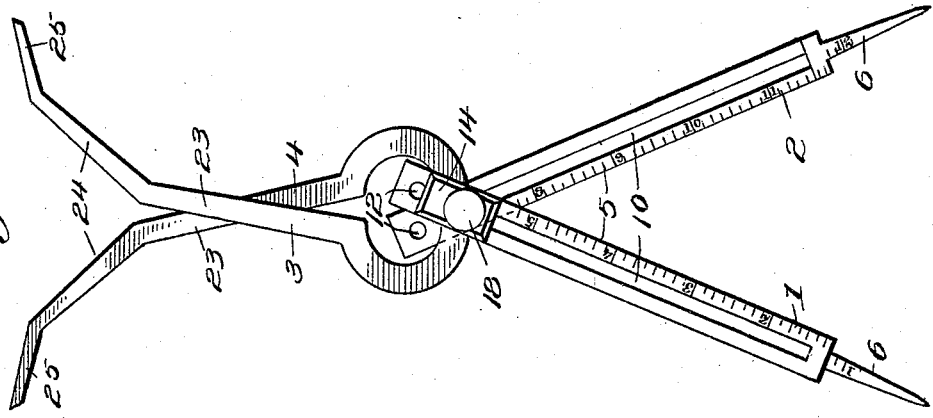
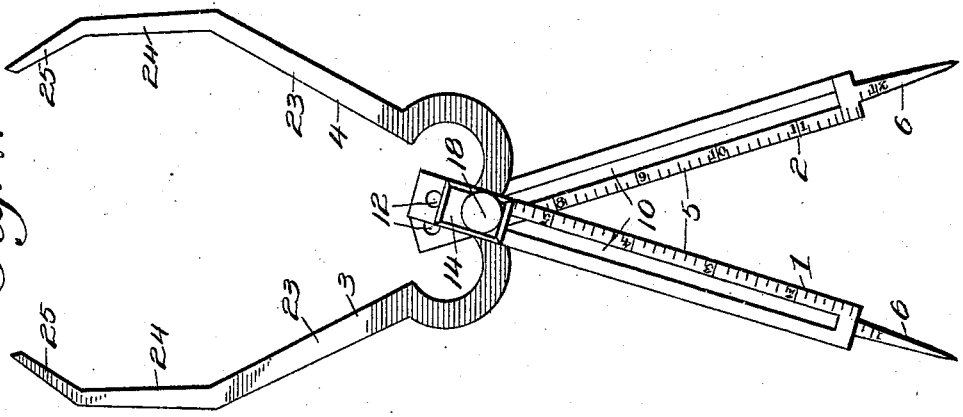
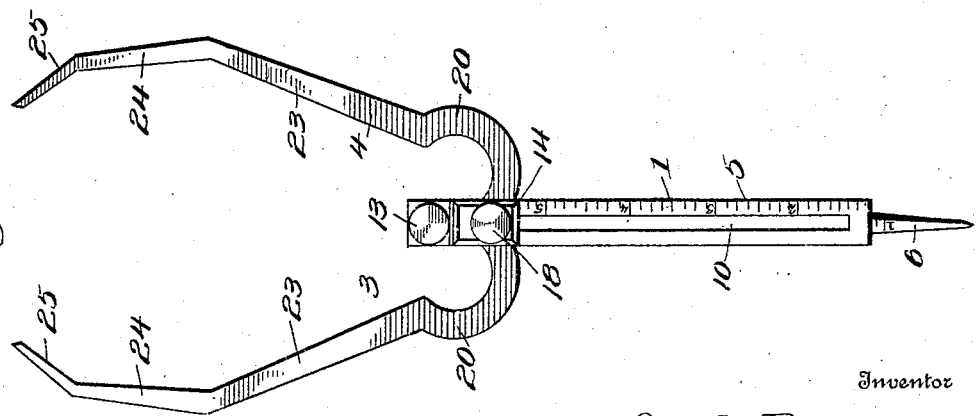
Inventor
Oreste Pappano
By Victor J. Evans
Attorney
Witnesses

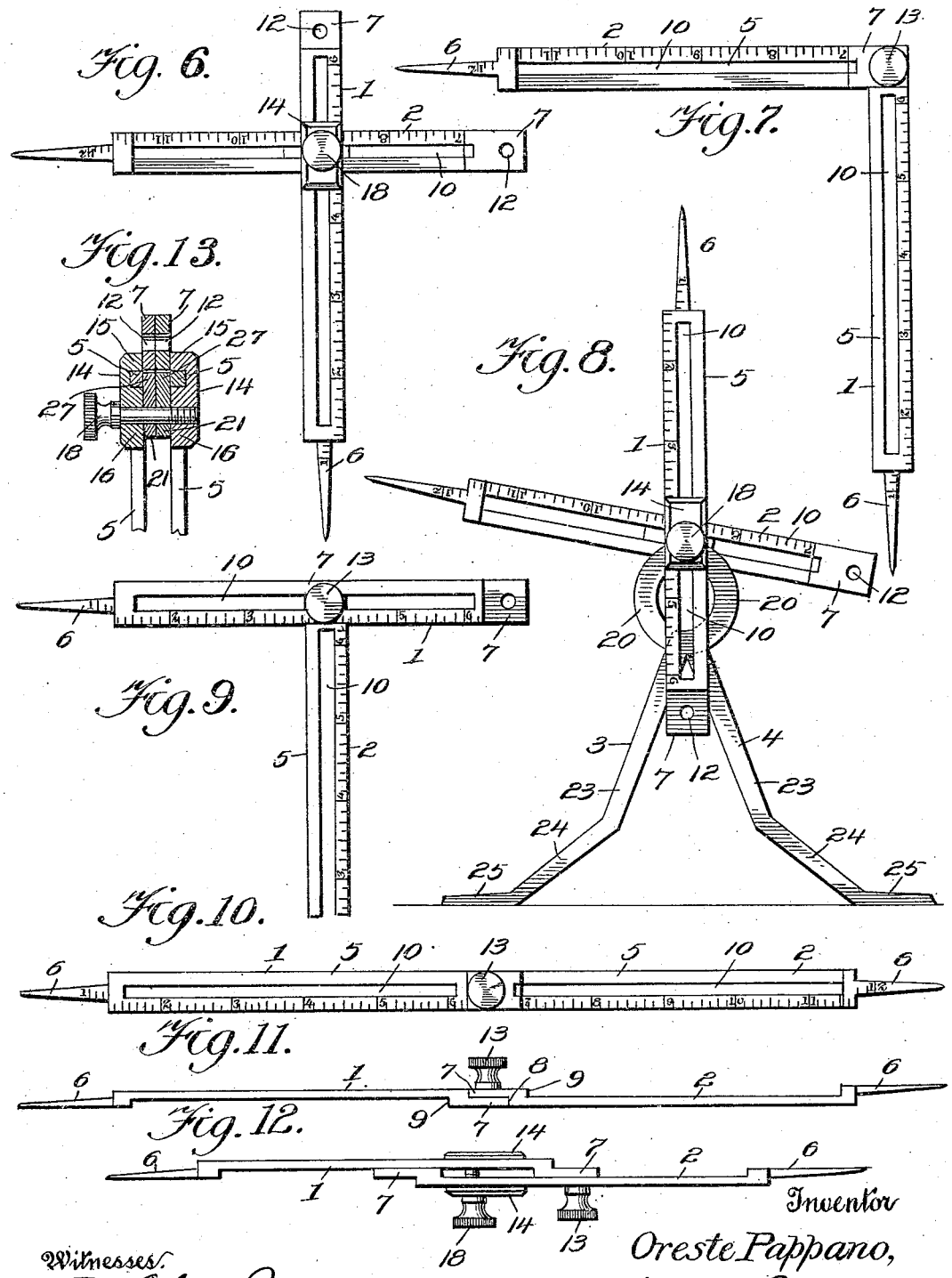

UNITED STATES PATENT OFFICE.

ORESTE PAPPANO, OF PHILADELPHIA, PENNSYLVANIA.

MEASURING INSTRUMENT.

No. 929,477.　　　　　Specification of Letters Patent.　　　　Patented July 27, 1909.

Application filed January 12, 1909. Serial No. 471,950.

*To all whom it may concern:*

Be it known that I, ORESTE PAPPANO, a citizen of the United States, residing at Philadelphia, in the county of Philadelphia and State of Pennsylvania, have invented new and useful Improvements in Measuring Instruments, of which the following is a specification.

The invention relates to an improvement in measuring instruments, being more particularly directed to an instrument of the compass or divider type, in which the parts are so constructed and arranged as to permit the use of the instrument for a variety of purposes impossible with the compass or divider of standard construction.

The main object of the present invention is the provision of a measuring instrument including a pair of divider legs and a pair of caliper arms, which are so individually constructed and arranged for such connection as to adapt the parts to provide a variety of well known instruments.

The invention will be described in the following specification, reference being had particularly to the accompanying drawings, in which:—

Figure 1 is a plan of the completed instrument with the parts in folded or inoperative position. Fig. 2 is a similar view with the caliper arms removed and the divider legs opened. Fig. 3 is a plan of the instrument, showing the parts arranged to provide for the use of the caliper arms only. Fig. 4 is a similar view, showing the parts arranged to provide an outside caliper, the marking points of the divider legs being automatically actuated in the movement of the caliper arms. Fig. 5 is a similar view showing the parts arranged to provide an inside caliper. Fig. 6 indicates the arrangement of the divider legs to form a depth gage. Fig. 7 is a plan showing the arrangement of the divider legs to provide a square. Fig. 8 is an elevation, showing the parts arranged to provide another form of instrument. Fig. 9 is a plan view, showing the divider legs arranged to form a T-square. Fig. 10 is a plan, showing the divider legs arranged to provide a ruler. Fig. 11 is an edge view of the same. Fig. 12 is an edge view of the divider legs arranged to provide an adjustable ruler. Fig. 13 is an enlarged sectional view through the caliper arms and divider legs at the point of connection when the parts are arranged to provide calipers. Fig. 14 is a broken perspective of one end of one of the divider legs. Fig. 15 is a perspective view of the clamp plates. Fig. 16 is a broken plan, showing the engaging ends of the caliper arms.

Referring particularly to the accompanying drawings the improved measuring instrument is made up of divider legs 1 and 2 of duplicate construction, and caliper arms 3 and 4 of duplicate construction. Each of the divider legs comprises an elongated rectangular metallic strip 5, which, at one end, is reduced or otherwise formed to provide a point 6, preferably of the type usual in such instruments. At the opposing end the strip is relatively offset to provide what may be termed a pivot section 7, Fig. 14. The pivot section is squarely offset from the main length of the strip so that the outer end of the strip forms an abrupt shoulder 8 with the section, while the inner end of the section forms an abrupt shoulder 9 with the strip. The main length of the strip is centrally formed with a slot 10, which slot terminates at one end adjacent the pointed end of the strip and at the opposite end in alinement with the shoulder 9, or with the inner end of the pivot section. The pivot section, in alinement with the slot 10, is formed with a recess 11 corresponding in sectional dimensions to that of the strip, this recess being of a length approximately equal to the distance between the shoulders 8 and 9. Therefore, viewed on the face side the strip appears formed with a longitudinal and centrally arranged slot terminating adjacent the respective ends of the strip, while viewed on the rear side the slot appears to have a continuation in the recess 11, it being understood that the pivot section is offset from the rear surface of the strip.

As before stated the divider legs 1 and 2 are of identical construction, and the pivot section 7 of each is formed with an opening 12 for the reception of a pivot pin 13, whereby to operatively connect the sections, one or the other of the openings 12 being threaded to provide for such engagement of the pin as will prevent the casual displacement of the latter.

In connection with each of the divider legs I use what I term a clamp plate 14, comprising a metallic section or plate corresponding in width to the width of the strip of the divider leg and formed on the relatively inner surface with spaced lugs 15 and 16. The lug 15 is of less length than the lug 16, but both lugs are of transverse sectional dimensions corresponding to the similar dimensions of the slot 10, so that with the lugs inserted in the slot the clamp plate may be freely moved longitudinally of the strip to any desired position. The lugs 15 and 16 are spaced apart a distance corresponding to the length between the end of the slot 10 and the proximate end of the strip 5 at the pivot end of the divider leg, so that if desired the clamp plate may be arranged with the lug 15 bearing against the end of the strip and the lug 16 fitted in the slot 10, with the material of the strip inserted between the lugs as seen in Fig. 13. The plate will thus be held in fixed relation to the strip, as is desirable in some uses to which the instrument is adapted. The lug 16 of each clamping plate is formed with an opening 17 to receive a clamping pin 18, one of the openings being threaded to coöperate with threads on the pin to connect the opposing clamp plates when desired.

The caliper arms, which are of duplicate construction, each include a metallic strip 19 formed at one end to provide a semi-annular portion 20 which terminates in a disk head 21, centrally formed with an opening 22 of a size to receive the clamp pin 18. Beyond the annular portion 20 the strip is projected in a series of angularly related sections 24 and 25, thus forming an arm of the shape desired. The material of which the caliper arm is formed corresponds in thickness to the thickness of the pivot section of the divider legs, so that when the divider legs are arranged with the relatively inner surfaces of their pivot sections in contact, the space thus formed between the main lengths of the legs is just sufficient to accommodate the disk heads of the caliper arms.

In conjunction with the parts described I will, in some uses of the instrument, connect in position a protractor 26, and while preferring such part of the outline shown in Figs. 1 and 2 it is obvious that it may be of any desired construction so long as it will accommodate itself to the pivot pin 13.

The face surface of each divider leg is along one wall of the slot 10 graduated to indicate any desired linear measurement, the graduations on the respective legs being so arranged that when the legs are arranged in alinement, as will be presently described, a continuous linear measure is provided throughout the length.

With the parts of the instrument described, I am enabled to construct a variety of instruments of well known type, a few of which are illustrated and will be hereinafter specifically referred to.

In Fig. 2 the legs 1 and 2 are shown pivotally connected by the pin 13 on which, between the pivot sections 7, is secured a protractor 26 with its base line coincident with the longitudinal median line of one of the legs, so that the other may overlie and register with the angular gradations upon the protractor.

In Fig. 3 I have shown the instrument in use as an ordinary caliper in which the clamp plates 14 are slidably mounted in the slots 10 of the respective legs and connected by the clamp pin 18, on which pin intermediate the legs are mounted caliper arms by means of openings 22. As the clamp plates are freely slidable in the slots in the arms, the movement of the caliper arms does not, in this arrangement of parts affect the legs.

In Fig. 4 I have shown the parts arranged to provide outside calipers in which the adjustment of the caliper arms will operate to simultaneously and similarly adjust the divider legs. The arrangement of parts of this device will be more readily understood by reference to Fig. 13, where, as shown, it will be noted that the clamp plates 14 are each connected with the respective divider legs, said blocks being, however, fixed against sliding movement relative to the legs by so arranging the blocks that the portion of the strip 5 between the end wall of the slot 10 and the proximate end wall of the strip will fit between the lugs 15 and 16 on the blocks. In this position the lug 15 rests against the outer face of the pivot section beyond the end of the strip, while the lug 16 rests in the slot 10 immediately adjacent the end of the strip. On the clamp pin 18 which unites the clamp plates thus positioned is pivotally mounted the respective caliper arms, the pin passing through said openings 22 in said arms. The disk heads 21 of the respective arms, however, are provided with radially projecting fingers 27, which are of a size to accurately fit in the recesses 11 in the relatively inner ends of the pivot sections. As the pivot sections 7 are in contact it will be obvious that the recesses 11 therein are immediately adjacent so that with the caliper arms pivotally mounted upon the clamping pin 18 the fingers 27 will fit in the recesses 11 of the respective pivot sections. The clamp plates are held against movement relative to the legs and in turn support the caliper arms against independent movement other than a pivotal one. The caliper arms by reason of the fingers 27 are fixed against independent movement relative to the divider legs. Therefore, each movement of the arms induces a simultaneous and similar movement of the legs so that the indicated distance between the points of the caliper arms will be identical with the indicated distance between the points of the divider legs. Fig. 5 represents a similar structure with the caliper arms reversed to provide inside calipers.

Fig. 6 shows the device used for a depth gage in which the respective arms are connected for sliding movement at right angles so that the distance of one from the point of the other will be indicated in the linear gradations, thereby permitting the measurement in height or depth as desired.

In Fig. 7 the legs are connected by the pivot pin 13, one of the pivot sections, however, being arranged to present one of its side edges in contact with the shoulder 8 of the other leg. As this shoulder is at right angles to the longitudinal plane of the leg, it is obvious that by this connection the legs will be arranged at right angles to each other, forming a square.

In Fig. 8 the device is shown as a gage in which the caliper arms are arranged for use as an inside caliper and the legs are pivotally connected through the medium of the clamp pin 18 which arranges the arms in place.

In Fig. 9 the parts are shown arranged as a T-square, wherein one of the legs, as 2, is connected centrally in the slot of the other leg by the pivot pin 13, the cross leg being arranged to bear against the shoulder 8, thereby arranging the respective legs at right angles to form a T-square.

In Figs. 10 and 11 the respective legs are united in alinement by reversing the normal position of the respective pivot sections and connecting them by the pin 13. In this arrangement the gradations are continuous throughout the length of the alined legs, as previously stated.

In Fig. 12 the parts are arranged to provide a sliding linear measure, for which purpose the respective legs are arranged with the inner surface of the pivot section of each leg in contact with the inner surface of the opposing leg beyond the pivot section. The clamp plates are applied for sliding movement in each slot and connected by the clamp pin 18. One of the pivot sections 7 is connected to the opposing leg by the pivot pin 13 passed through the slot in the leg and taking into the pivot section. The respective legs are thus held in longitudinal alinement for use as a linear measure, it being obvious that by releasing the screws 13 and 14 the respective legs may be drawn apart or moved together to increase or decrease the length of the measure as desired.

Having thus described the invention what is claimed as new, is:—

1. A compass including duplicate divider legs and duplicate divider arms, clamping plates arranged to engage the legs, and means for pivotally connecting the divider arms to the clamp plates.

2. A compass including duplicate divider legs and duplicate divider arms, clamping plates arranged to engage the legs, and means for pivotally connecting the divider arms to the clamp plates, said arms being formed to engage the legs and prevent independent movement of either of said parts.

3. A compass including divider legs each formed with a longitudinal slot, a clamp plate for each leg formed with spaced lugs adapted to seat in the slot in the leg and in one position to engage the material of the leg at the end of the slot to prevent independent longitudinal movement of the plate, a pivot pin uniting the plates of the respective legs, and caliper arms mounted on the pin.

4. A compass including divider legs each formed with a longitudinal slot, a clamp plate for each leg formed with spaced lugs adapted to seat in the slot in the leg and in one position to engage the material of the leg at the end of the slot to prevent independent longitudinal movement of the plate, a pivot pin uniting the plates of the respective legs, caliper arms mounted on the pin, each leg being formed with a recess, and a projection extending from each arm arranged to engage the recess of the adjacent leg when the clamp plates are in fixed position with relation to the legs.

In testimony whereof I affix my signature in presence of two witnesses.

ORESTE PAPPANO.

Witnesses:
    JOSEPH A. SYLVESTER,
    ADALBERTO CAPOIRLE.